United States Patent
Gudimetla et al.

(10) Patent No.: US 11,874,899 B2
(45) Date of Patent: Jan. 16, 2024

(54) AUTOMATED MULTIMODAL ADAPTATION OF MULTIMEDIA CONTENT

(71) Applicant: International Business Machines Corporation, Armonk, NY (US)

(72) Inventors: Sai Krishna Reddy Gudimetla, Jersey City, NJ (US); Aaron K Baughman, Cary, NC (US); Micah Forster, Round Rock, TX (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 384 days.

(21) Appl. No.: 17/122,603

(22) Filed: Dec. 15, 2020

(65) Prior Publication Data

US 2022/0188564 A1 Jun. 16, 2022

(51) Int. Cl.
| | |
|---|---|
| *G06F 18/214* | (2023.01) |
| *G06F 18/21* | (2023.01) |
| *G06F 18/22* | (2023.01) |
| *G06N 3/08* | (2023.01) |
| *G06V 20/40* | (2022.01) |
| *G06N 3/045* | (2023.01) |
| *G06N 3/047* | (2023.01) |
| *G06V 10/82* | (2022.01) |
| *G06V 20/70* | (2022.01) |

(52) U.S. Cl.
CPC ........ *G06F 18/214* (2023.01); *G06F 18/2178* (2023.01); *G06F 18/22* (2023.01); *G06N 3/08* (2013.01); *G06V 20/47* (2022.01)

(58) Field of Classification Search
CPC .... G06F 18/214; G06F 18/2178; G06F 18/22; G06N 3/08; G06N 3/045; G06N 3/047; G06V 20/47; G06V 10/82; G06V 20/70
See application file for complete search history.

(56) References Cited

U.S. PATENT DOCUMENTS

| | | | |
|---|---|---|---|
| 10,410,222 | B2 | 9/2019 | Brueck et al. |
| 10,564,991 | B2 | 2/2020 | Kotlicki et al. |

(Continued)

FOREIGN PATENT DOCUMENTS

| | | |
|---|---|---|
| WO | 2017223530 A1 | 12/2017 |
| WO | 2018053340 A1 | 3/2018 |

OTHER PUBLICATIONS

Xu et al., Neural Response Generation Via GAN With An Approximate Embedding Layer, Proceedings of the 2017 Conference on Empirical Methods in Natural Language Processing, Copenhagen, Denmark, Sep. 7-11, 2017.

(Continued)

*Primary Examiner* — John W Lee
(74) *Attorney, Agent, or Firm* — Garg Law Firm, PLLC; Rakesh Garg; Michael O'Keefe

(57) ABSTRACT

Using a first trained generative adversarial network, a first multimedia content is transformed into a text description of the first multimedia content. The text description is adjusted according to a constraint using a trained attention layer, the adjusting creating an adjusted text description. Using a trained model, the adjusted text description is transformed into a second multimedia content, the second multimedia content comprising an adjustment of the first multimedia content according to the constraint.

18 Claims, 10 Drawing Sheets

(56) References Cited

U.S. PATENT DOCUMENTS

| | | | |
|---|---|---|---|
| 10,565,612 | B2 | 2/2020 | Jamison et al. |
| 10,565,802 | B2 | 2/2020 | Grossmann et al. |
| 10,692,103 | B2* | 6/2020 | Hasan ............... G06Q 30/0241 |
| 10,713,821 | B1* | 7/2020 | Surya ..................... G06N 3/045 |
| 10,719,478 | B2 | 7/2020 | Jadhav et al. |
| 2017/0148226 | A1 | 5/2017 | Zhang et al. |
| 2019/0103092 | A1* | 4/2019 | Rusak ..................... G06N 3/045 |
| 2019/0304157 | A1* | 10/2019 | Amer ...................... G06V 40/23 |
| 2019/0325342 | A1 | 10/2019 | Sikka et al. |
| 2020/0089813 | A1 | 3/2020 | Chauhan et al. |
| 2020/0134089 | A1 | 4/2020 | Sankaran et al. |
| 2020/0204880 | A1 | 6/2020 | Viswanathan |
| 2020/0245004 | A1 | 7/2020 | Karapantelakis et al. |
| 2020/0245009 | A1* | 7/2020 | Saini ................ H04N 21/23614 |
| 2020/0320348 | A1* | 10/2020 | Yang ...................... G06V 20/00 |

OTHER PUBLICATIONS

Mithun et al., Learning Joint Embedding With Multimodal Cues For Cross-Modal Video-Text Retrieval, ICMR'18, Jun. 11-14, 2018, Yokohama, Japan.

Amir et al., Modelling Context With User Embeddings For Sarcasm Detection In Social Media, Proceedings of the 20th SIGNLL Conference on Computational Natural Language Learning (CoNLL), Berlin, Germany, Aug. 7-12, 2016.

Sikka et al., Deep Unified Multimodal Embeddings For Understanding Both Content And Users In Social Media Networks, Jun. 11, 2019.

Yin, Multi-Resolution Generative Adversarial Networks for Tiny-Scale Pedestrian Detection, 2019 IEEE International Conference on Image Processing (ICIP), 2019.

Lu et al., Autonomous Choice of Deep Neural Network Parameters by a Modified Generative Adversarial Network, 2019 IEEE International Conference on Image Processing (ICIP), 2019.

Cui et al., Colorless Video Rendering System via Generative Adversarial Networks, 2019 IEEE International Conference on Artificial Intelligence and Computer Applications (ICAICA), 2019.

Zhang et al., Generating Artificial Images by Generative Adversary Network, PRAI '19: Proceedings of the 2019 the International Conference on Pattern Recognition and Artificial Intelligence, Aug. 2019.

Toutouh et al., Spatial Evolutionary Generative Adversarial Networks, GECCO '19, Jul. 13-17, 2019, Prague, Czech Republic.

Weng et al., A minority character generating method base on improved generative model, ICIAI '18: Proceedings of the 2nd International Conference on Innovation in Artificial Intelligence, Mar. 2018.

* cited by examiner

AUTOMATED MULTIMODAL ADAPTATION OF MULTIMEDIA CONTENT

BACKGROUND

The present invention relates generally to a method, system, and computer program product for multimedia content adaptation. More particularly, the present invention relates to a method, system, and computer program product for automated multimodal adaptation of multimedia content.

Multimedia content is content in the form of one or more of text, audio, video, and charts and other still-image graphical elements, in a single presentation. Text, audio, video, and charts and other still-image graphical elements are all examples of a presentation mode of multimedia content.

SUMMARY

The illustrative embodiments provide a method, system, and computer program product. An embodiment includes a method that transforms, using a first trained generative adversarial network, a first multimedia content into a text description of the first multimedia content. An embodiment adjusts, according to a constraint using a trained attention layer, the text description, the adjusting creating an adjusted text description. An embodiment transforms, using a trained model, the adjusted text description into a second multimedia content, the second multimedia content comprising an adjustment of the first multimedia content according to the constraint.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
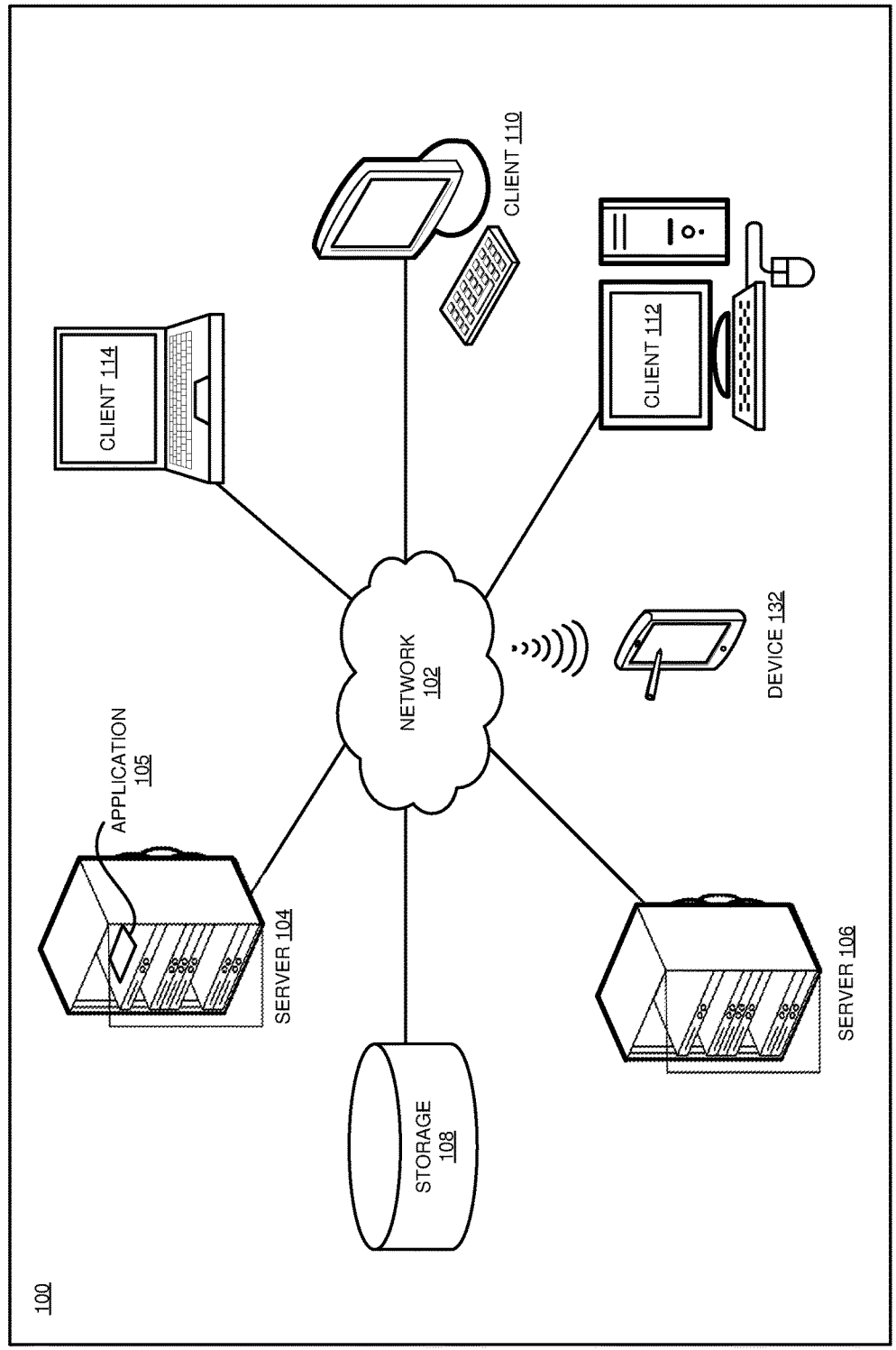
FIG. 1 depicts a block diagram of a network of data processing systems in which illustrative embodiments may be implemented.

The illustrative embodiments recognize that adapting multimedia content to different presentation modes and different audience needs is a complex task. Although techniques are presently available to convert content from one presentation mode to another (e.g. text to audio, or video to a text description of the video), such techniques process individual presentation modes separately and do not allow for automated content adjustment or content adjustment in real time. For example, a slide presentation including charts, text, and audio commentary might need to be repurposed into a shorter or longer audio-only presentation for distribution as a podcast. As another example, in response to real-time audience feedback data indicating that audience interest is waning, part of a remaining planned portion of an audio-video presentation might be removed and some dramatic music added to reengage the audience. Consequently, the illustrative embodiments recognize that there is an unmet need for content adjustment in real time in response to audience feedback, an updated duration for the content, or to conform to another requirement or constraint.

The illustrative embodiments recognize that the presently available tools or solutions do not address these needs or provide adequate solutions for these needs. The illustrative embodiments used to describe the invention generally address and solve the above-described problems and other problems related to automated multimodal adaptation of multimedia content.

An embodiment can be implemented as a software application. The application implementing an embodiment can be configured as a modification of an existing multimedia content generation system, as a separate application that operates in conjunction with an existing multimedia content generation system, a standalone application, or some combination thereof.

Particularly, some illustrative embodiments provide a method that uses a trained generative adversarial network to transform a first multimedia content into a text description of the content, adjusts the text description according to a constraint using a trained attention layer, and uses a trained model to transform the adjusted text description into a second multimedia content.

A generative adversarial network (GAN) is a learning model that includes two sub-models: a generator network that generates new examples of data within a particular domain (e.g. still images) and a discriminator network that classifies a pool of examples as either real (from the problem domain), or fake (generated by the generator model). During training, weights within the discriminator network are updated to improve at discriminating future real and fake examples, and weights within the generator network are updated based on how well, or not, the generated examples fooled the discriminator model. Already trained GANs are presently available to convert visual chart content, video content, and audio content to a text description of the content, and to convert a text description to video and audio content.

However, the trained GANs that are presently available are trained using general sets of training data, and are not specific to a particular knowledge domain. For example, a GAN trained using a set of generally-available user-generated video content discussing movies and television shows might not be have a sufficient understanding of specialized vocabulary or concepts to process video content meant for medical students or a specialized business audience without making an unacceptable number of errors. Thus, an embodiment further trains a presently available GAN using knowledge domain specific training data.

In particular, an embodiment trains a presently available GAN using a second discriminator network that is separate from the GAN's discriminator network. Techniques and architectures for implementing the second discriminator network are presently available. An embodiment uses labelled knowledge domain specific training data and labelled GAN-generated data to train the second discriminator network to distinguish real data from GAN-generated data. Once the second discriminator network has been trained to an accuracy level above a threshold, the embodiment uses the output of the trained second discriminator network to update the generator portion of the GAN, thus training the GAN to a particular knowledge domain.

An embodiment transforms a non-text portion of multimedia content into a text description or an encoded text description of the portion. One set of embodiments uses one or more trained GANs to transform a non-text portion of multimedia content into an optionally encoded text description of the portion. In particular, if the multimedia content includes video content, an embodiment uses a video-to-text trained GAN to generate an optionally encoded text description of the video content. If the multimedia content includes audio content, an embodiment uses an audio-to-text trained GAN to generate an optionally encoded text description of the audio content. If the multimedia content includes visual chart content, an embodiment uses a chart-to-text trained GAN to generate an optionally encoded text description of the visual chart content. If the multimedia content includes another type of content, an embodiment uses a GAN trained to process that type of content to generate an optionally encoded text description of the content. Another embodiment uses a convolutional neural network and a text transformation model to transform a non-text portion of multimedia content into an optionally encoded text description of the portion. A text transformation model, for example a seq2seq model, transforms text into a paraphrase of the original text or text in a different language from the original text, or transforms encoded text into an encoded paraphrase or an encoded different language from the original text. Another embodiment uses a supervised deep learning network to transform a non-text portion of multimedia content into an optionally encoded text description of the portion.

An embodiment, optionally, encodes a narrative text portion of multimedia content. The encoding is also referred to as an embedding. An embedding represents a portion of text, such as a word, sentence, or other subdivision, as a set of numbers on a common scale (e.g. zero to one). The encoding algorithm is designed so that, if each embedding represents a point in a multidimensional space, two embeddings representing similar units of text are close to each other in the space.

An embodiment uses an attention layer to adjust one or more of an optionally encoded text description and optionally encoded narrative text of multimedia content according to a constraint. Because the attention layer performs the adjustment by reweighting an input, the attention layer is able to operate on both encoded and unencoded text. One type of constraint specifies a presentation mode of the adjusted multimedia content, for example using text, audio, video, chart content, or a combination. To implement a presentation mode constraint, an embodiment adjusts one or more weights within the attention layer to increase attention to a desired type of input content and decrease attention to other types of input content. Another type of constraint is a time constraint, constraining a duration of an adjusted version of the multimedia content either as a constant (e.g., one hour) or relative to a duration of the input content (e.g., ten minutes shorter). To implement a time constraint, one embodiment adjusts one or more weights within the attention layer to decrease attention to later content relative to attention applied to earlier content. An embodiment calculates duration for content without a specific duration by using heuristics and the length and type of the content, for example an average reading time for a particular type of text and viewing time for a particular type of chart or a chart with a particular level of detail. For example, the presentation mode and time constraints together might specify that a twenty-slide presentation including charts, text, and audio commentary be adjusted into a half-hour audio-only presentation for distribution as a podcast. Another type of constraint is a content constraint, constraining content of the adjusted version of the multimedia content. Some non-limiting examples of a content constraint are a target knowledge domain (e.g. chemistry or business), a target level of knowledge (e.g. a tutorial for first-year college students or a presentation for their professors), a target reading level, a target audience attention level, a target level of a particular sentiment or emotion, and the like. For example, for a target audience attention level, measured using feedback data measuring a percentage of time an audience member is looking towards a screen rather than in another direction, an embodiment might modify one or more weights in the attention layer to reweight visual content to achieve the target audience attention level.

In one embodiment, constraints are constant. In another embodiment, one or more constraints are dynamically updated in response to feedback data. For example, in response to real-time audience feedback data collected from one or more sensors indicating that audience interest is waning, part of a remaining planned portion of an audio-video presentation might be removed and some dramatic music added to reengage the audience. Techniques to analyze feedback data (e.g. by analyzing images of an audience member to determine her direction of gaze and whether or not her eyes are open) are presently available.

An embodiment uses a trained attention layer to adjust one or more of an optionally encoded text description and optionally encoded narrative text of multimedia content. The attention layer includes a set of weights that adjust an input, producing an output. Because the attention layer performs the adjustment by reweighting an input, the attention layer is able to operate on both encoded and unencoded text. An embodiment trains the attention layer with a set of training data including constraints, feedback data, inputs, and outputs adjusted according to the constraints. During the training process, weights in the attention layer are adjusted until the layer's outputs for a particular set of constraints and inputs have at least a predetermined level of accuracy.

An embodiment uses a trained model to transform an adjusted encoded text description and adjusted encoded narrative text into second multimedia content. Another embodiment uses a trained model to transform an adjusted text description and adjusted narrative text into second multimedia content. To generate a non-text portion of the second multimedia content, an embodiment trains a presently available GAN using a second discriminator network that is separate from the GAN's discriminator model to a particular knowledge domain, in a manner described herein. An embodiment uses the trained GANs to transform an adjusted optionally encoded text description and adjusted optionally encoded narrative text into a non-text portion of the second multimedia content. In particular, to generate video content, an embodiment uses a text-to-video trained GAN. To generate audio content, an embodiment uses a text-to-audio trained GAN. To generate visual chart content, an embodiment uses a text-to-chart trained GAN. To generate another type of non-text content, an embodiment uses a GAN trained to process that type of content.

To generate a text portion of the second multimedia content, an embodiment uses a trained text transformation model. A text transformation model transforms text (optionally encoded), such as an adjusted text description and adjusted narrative text, into a paraphrase of the original text or text in a different language from the original text. Techniques for implementing a text transformation model, such as using the seq2seq model, are presently available. Text transformation models trained using general sets of training data are also presently available. Alternatively, an embodiment trains a text transformation model using training data relevant to a specific knowledge domain, using presently available techniques. Another embodiment uses a second discriminator network, trained to a specific knowledge domain, to modify the weights of a pretrained text transformation model by using a knowledge domain specific trained GAN trained to process non-text content.

One embodiment adapts stored multimedia content and stores the adapted result. Another embodiment adapts live-streamed multimedia content and live-streams the adapted result. During live-streamed content adaptation an embodiment receives one or more updated constraints, or receives feedback data and generates updated constraints, and adapts a later portion of the live-streamed content according to the updated constraints. During live-streamed content adaptation, one non-limiting example of an updated constraint is a duration of the adapted content.

The manner of automated multimodal adaptation of multimedia content described herein is unavailable in the presently available methods in the technological field of endeavor pertaining to multimedia content generation. A method of an embodiment described herein, when implemented to execute on a device or data processing system, comprises substantial advancement of the functionality of that device or data processing system in using a trained generative adversarial network to transform a first multimedia content into a text description of the content, adjusts the text description and narrative text in the content according to a constraint using a trained attention layer, and uses a trained model to transform the adjusted text description and adjusted encoded narrative text into a second multimedia content.

The illustrative embodiments are described with respect to certain types of contents, encodings, embeddings, GANs, models, constraints, transformations, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
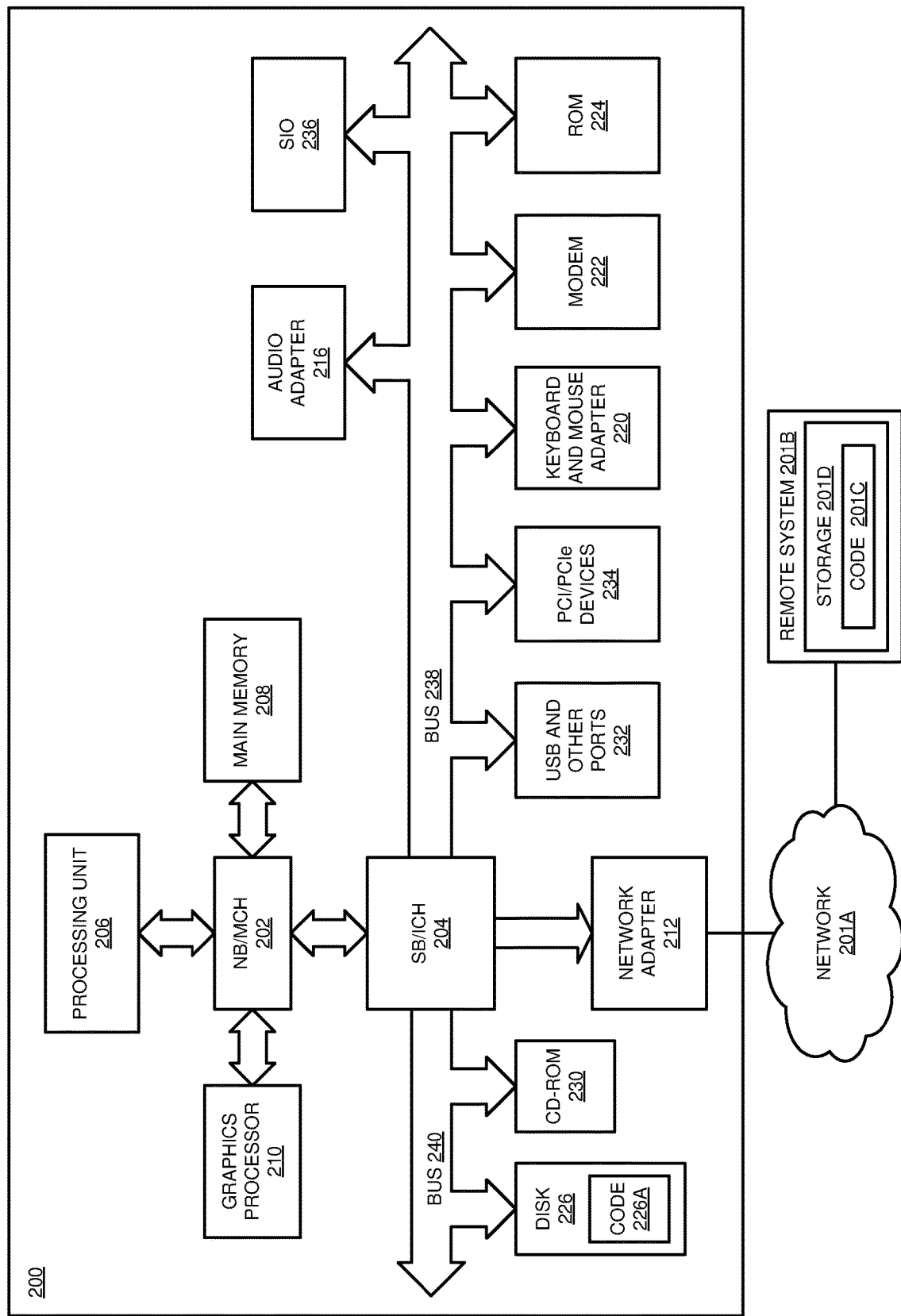
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 collects feedback data, if available, from storage or from a sensor included in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
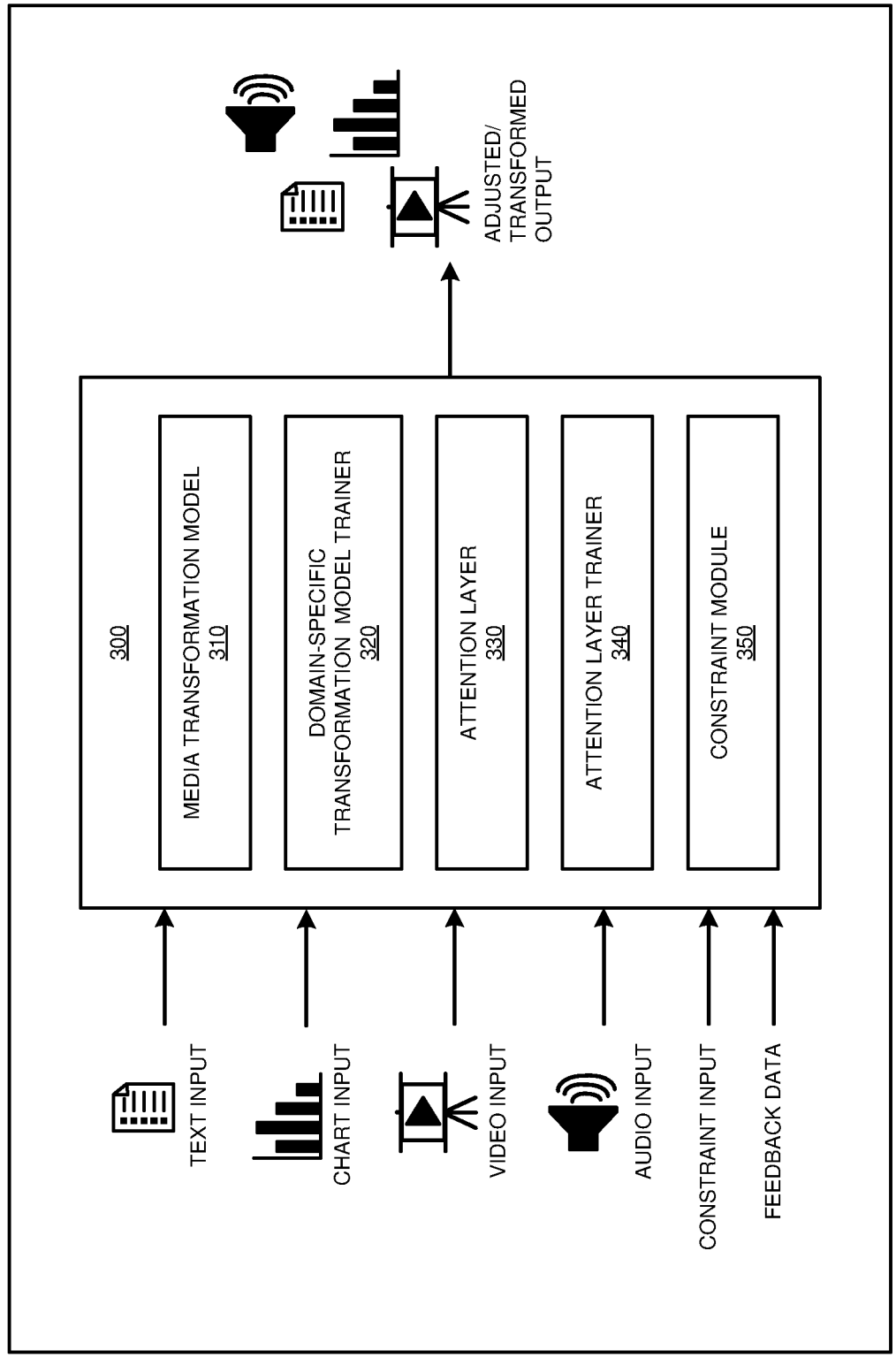
FIG. 3 depicts a block diagram of an example configuration for automated multimodal adaptation of multimedia content in accordance with an illustrative embodiment.

With reference to FIG. 3, this figure depicts a block diagram of an example configuration for automated multimodal adaptation of multimedia content in accordance with an illustrative embodiment. Application 300 is an example of application 105 in FIG. 1 and executes in any of servers 104 and 106, clients 110, 112, and 114, and device 132 in FIG. 1.

Domain-specific transformation model trainer 320 trains a model trained using general sets of training data to a particular knowledge domain. In particular, trainer 320 trains a presently available GAN using a second discriminator network that is separate from the GAN's discriminator model. Trainer 320 uses labelled knowledge domain specific training data and labelled GAN-generated data to train the second discriminator network to distinguish real data from GAN-generated data. Once the second discriminator network has been trained to an accuracy level above a threshold, trainer 320 uses the output of the trained second discriminator network to update the generator portion of the GAN, thus training the GAN to a particular knowledge domain.

Media transformation model 310 transforms a non-text portion of multimedia content into an optionally encoded text description of the portion. Media transformation model 310 also, optionally, encodes a narrative text portion of multimedia content. The encoding algorithm is designed so that, if each embedding represents a point in a multidimensional space, two embeddings representing similar units of text are close to each other in the space.

Application 300 receives constraint input and feedback data. One type of constraint specifies a presentation mode of the adjusted multimedia content. Another type of constraint is a time constraint, constraining a duration of an adjusted version of the multimedia content either as a constant or relative to a duration of the input content Another type of constraint is a content constraint, constraining content of the adjusted version of the multimedia content. Constraint module 350 maintains constraint input data, and analyzes feedback data and dynamically updates a constraint accordingly.

Attention layer 330 is a trained attention layer that adjusts one or more of an optionally encoded text description and optionally encoded narrative text of multimedia content. Attention layer 330 includes a set of weights that adjust an input, producing an output. Attention layer trainer 340 trains attention layer 330 with a set of training data including constraints, inputs, and outputs adjusted according to the constraints. During the training process, weights in attention layer 330 are adjusted until outputs for a particular set of constraints and inputs have at least a predetermined level of accuracy.

Media transformation model 310 transforms an adjusted text description and adjusted narrative text into second multimedia content. During live-streamed content adaptation, constraint module 350 receives one or more updated constraints, or receives feedback data and generates updated constraints, and model 310 and attention layer 330 adapt a later portion of the live-streamed content according to the updated constraints.

Figure 4:
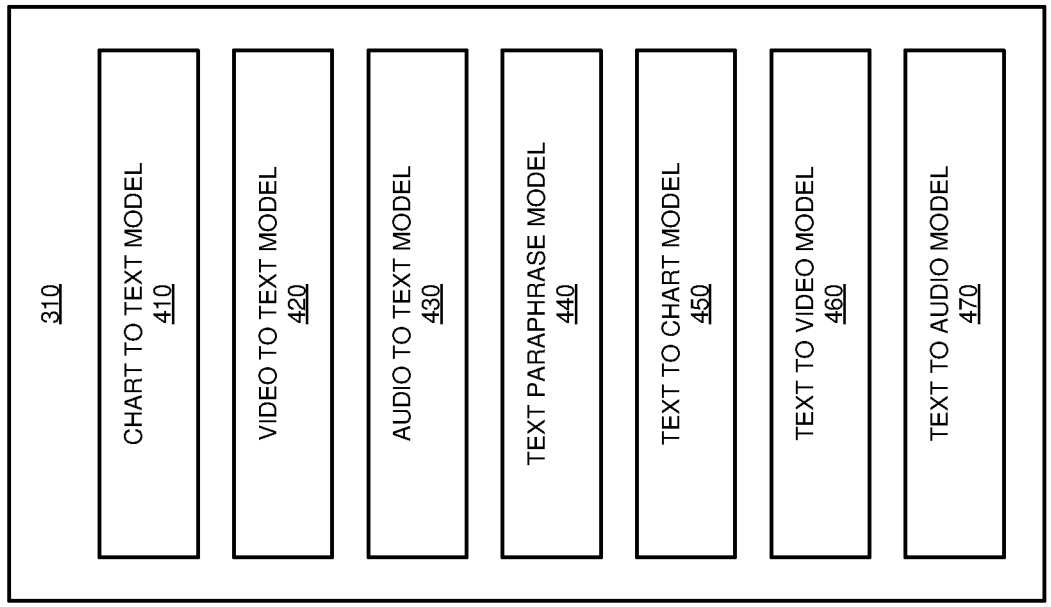
FIG. 4 depicts a block diagram of an example configuration for automated multimodal adaptation of multimedia content in accordance with an illustrative embodiment.

With reference to FIG. 4, this figure depicts a block diagram of an example configuration for automated multimodal adaptation of multimedia content in accordance with an illustrative embodiment. FIG. 4 depicts more detail of media transformation model 310 in FIG. 3.

Chart to text model 410, implemented as a trained GAN, generates a text description of input visual chart content. Video to text model 420, implemented as a trained GAN, generates a text description of input video content. Audio to text model 430, implemented as a trained GAN, generates a text description of input audio content. Text paraphrase model 440, implemented as a trained text transformation model, transforms an adjusted text description and adjusted narrative text into a paraphrase of the original text or text in a different language from the original text. Text to chart model 450, implemented as a trained GAN, generates visual chart content from an adjusted text description and adjusted narrative text. Text to video model 460, implemented as a trained GAN, generates video content from an adjusted text description and adjusted encoded narrative text. Text to audio model 470, implemented as a trained GAN, generates audio content from an adjusted text description and adjusted narrative text.

Figure 5:
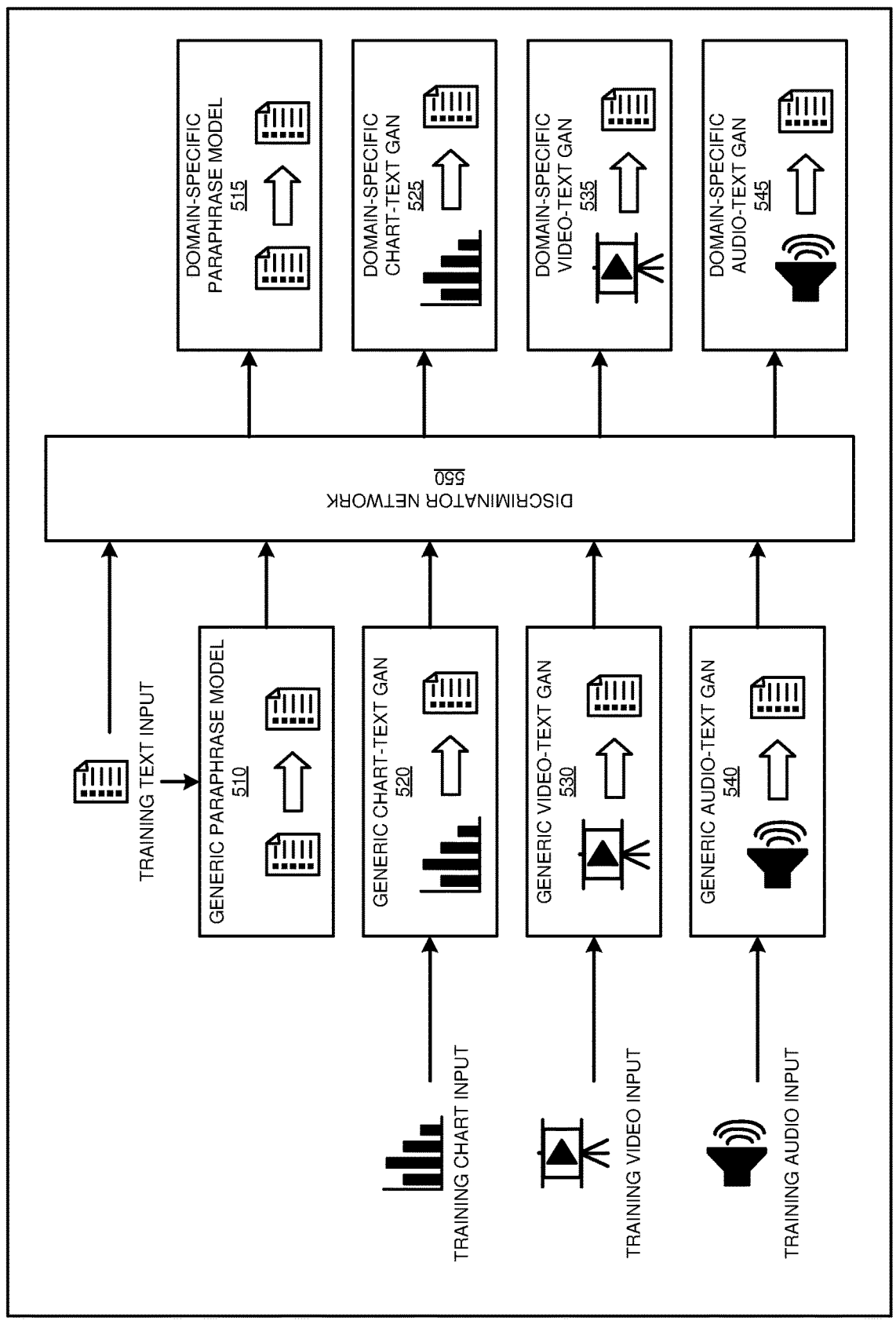
FIG. 5 depicts an example of automated multimodal adaptation of multimedia content in accordance with an illustrative embodiment.

With reference to FIG. 5, this figure depicts an example of automated multimodal adaptation of multimedia content in accordance with an illustrative embodiment. The example can be executed using application 300 in FIG. 3.

As depicted, application 300 uses labelled knowledge domain specific training data to train discriminator network 550 to distinguish real data from GAN-generated data. Thus, discriminator network 550 is trained to distinguish training text input from data generated by generic paraphrase model 510, then the output of discriminator network 550 used to update model 510, creating domain-specific paraphrase model 515. Discriminator network 550 is trained to distinguish training chart input from data generated by generic chart-text GAN 520, then the output of discriminator network 550 used to update the generator portion of GAN 520, creating domain-specific chart-text GAN 525. Discriminator network 550 is trained to distinguish training video input from data generated by generic video-text GAN 530, then the output of discriminator network 550 used to update the generator portion of GAN 530, creating domain-specific video-text GAN 535. Discriminator network 550 is trained to distinguish training audio input from data generated by generic audio-text GAN 540, then the output of discriminator network 550 used to update the generator portion of GAN 540, creating domain-specific audio-text GAN 545.

Figure 6:
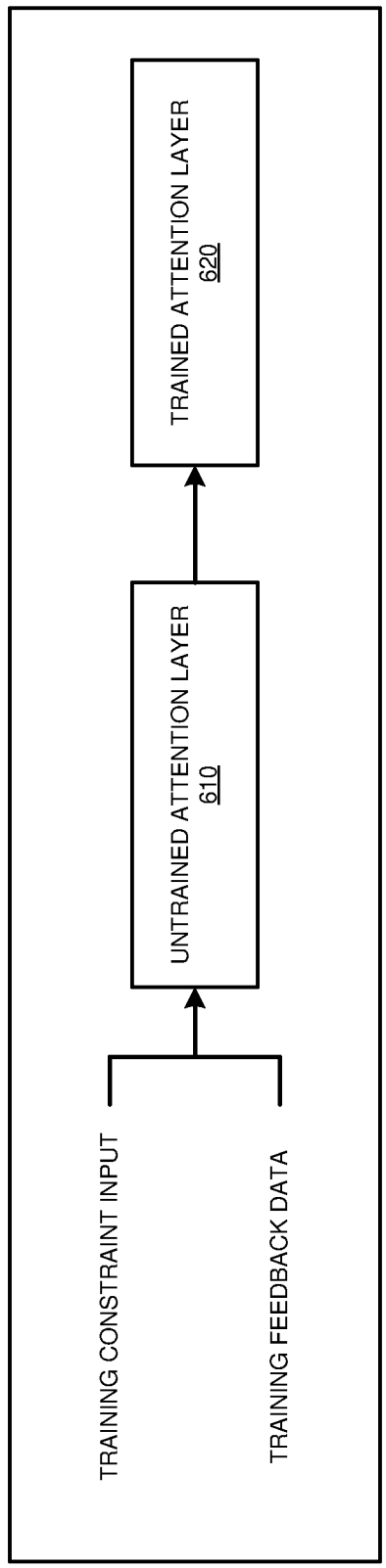
FIG. 6 depicts a continued example of automated multimodal adaptation of multimedia content in accordance with an illustrative embodiment.

With reference to FIG. 6, this figure depicts a continued example of automated multimodal adaptation of multimedia content in accordance with an illustrative embodiment. The example can be executed using application 300 in FIG. 3.

As depicted, application 300 trains untrained attention layer 610 with a set of training data including constraints, feedback data, inputs, and outputs adjusted according to the constraints. During the training process, weights in the attention layer are adjusted until the layer's outputs for a particular set of constraints and encoded inputs have at least a predetermined level of accuracy. The result is trained attention layer 620.

Figure 7:
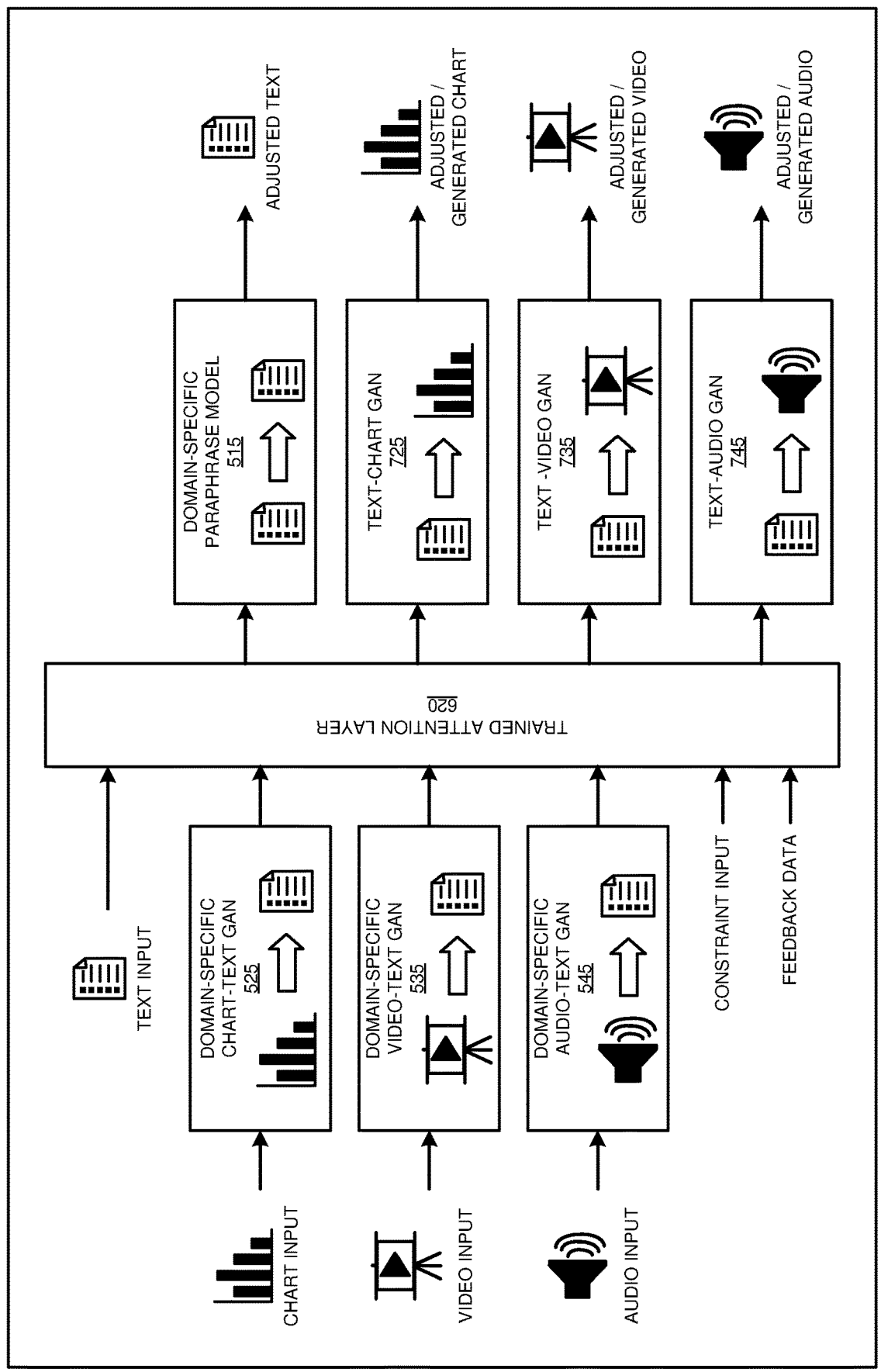
FIG. 7 depicts a continued example of automated multimodal adaptation of multimedia content in accordance with an illustrative embodiment.

With reference to FIG. 7, this figure depicts a continued example of automated multimodal adaptation of multimedia content in accordance with an illustrative embodiment. Domain-specific chart-text GAN 525, domain-specific video-text GAN 535, domain-specific audio-text GAN 545, and domain-specific paraphrase model 515 are the same as domain-specific chart-text GAN 525, domain-specific video-text GAN 535, domain-specific audio-text GAN 545, and domain-specific paraphrase model 515 in FIG. 5. Trained attention layer 620 is the same as trained attention layer 620 in FIG. 6.

Application 300, optionally, encodes a narrative text portion of input multimedia content, using an encoding algorithm designed so that, if each embedding represents a point in a multidimensional space, two embeddings representing similar units of text are close to each other in the space. As well, application 300 uses domain-specific chart-text GAN 525 to generate an optionally encoded text description of input visual chart content. Application 300 uses domain-specific video-text GAN 535 to generate an optionally encoded text description of input video content. Application 300 uses domain-specific audio-text GAN 545 to generate an optionally encoded text description of input audio content.

Trained attention layer 620 adjusts an optionally encoded text description and optionally encoded narrative text of multimedia content according to constraint input and feedback data. Then, domain-specific paraphrase model 515 transforms the optionally encoded adjusted text into a paraphrase of the original text or text in a different language from the original text. Text-chart GAN 725 transforms the optionally encoded adjusted text into adjusted visual chart content. Text-video GAN 735 transforms the optionally encoded adjusted text into adjusted video content. Text-audio GAN 745 transforms the optionally encoded adjusted text into adjusted audio content.

Figure 8:
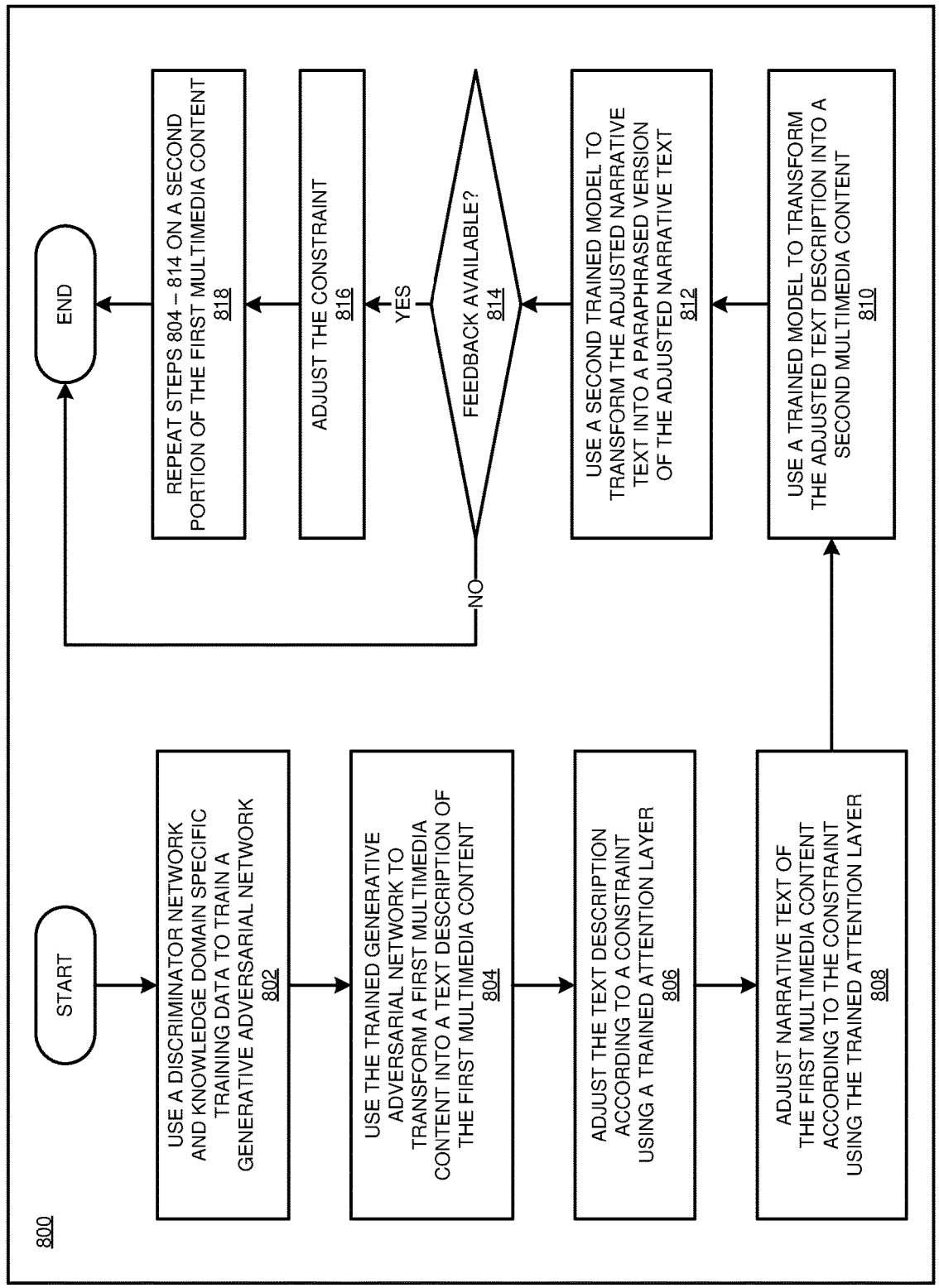
FIG. 8 depicts a flowchart of an example process for automated multimodal adaptation of multimedia content in accordance with an illustrative embodiment.

With reference to FIG. 8, this figure depicts a flowchart of an example process for automated multimodal adaptation of multimedia content in accordance with an illustrative embodiment. Process 800 can be implemented in application 300 in FIG. 3.

In block 802, the application uses a discriminator network and knowledge domain specific training data to train a generative adversarial network. In block 804, the application uses the trained generative adversarial network to transform a first multimedia content into a text description of the first multimedia content. In block 806, the application adjusts the text description according to a constraint using a trained attention layer. In block 808, the application adjusts narrative text of the first multimedia content according to the constraint using the trained attention layer. In block 810, the application uses a trained model to transform the adjusted text description into a second multimedia content. In block 812, the application uses a second trained model to transform the adjusted narrative text into a paraphrased version of the adjusted narrative text. In block 814, the application checks whether feedback data is available. If so ("YES" path of block 814), in block 816, the application adjusts the constraint, and in block 818 the application repeats blocks 804-814 on a second portion of the first multimedia content. Then (also "NO" path of block 814) the application ends.

Figure 9:
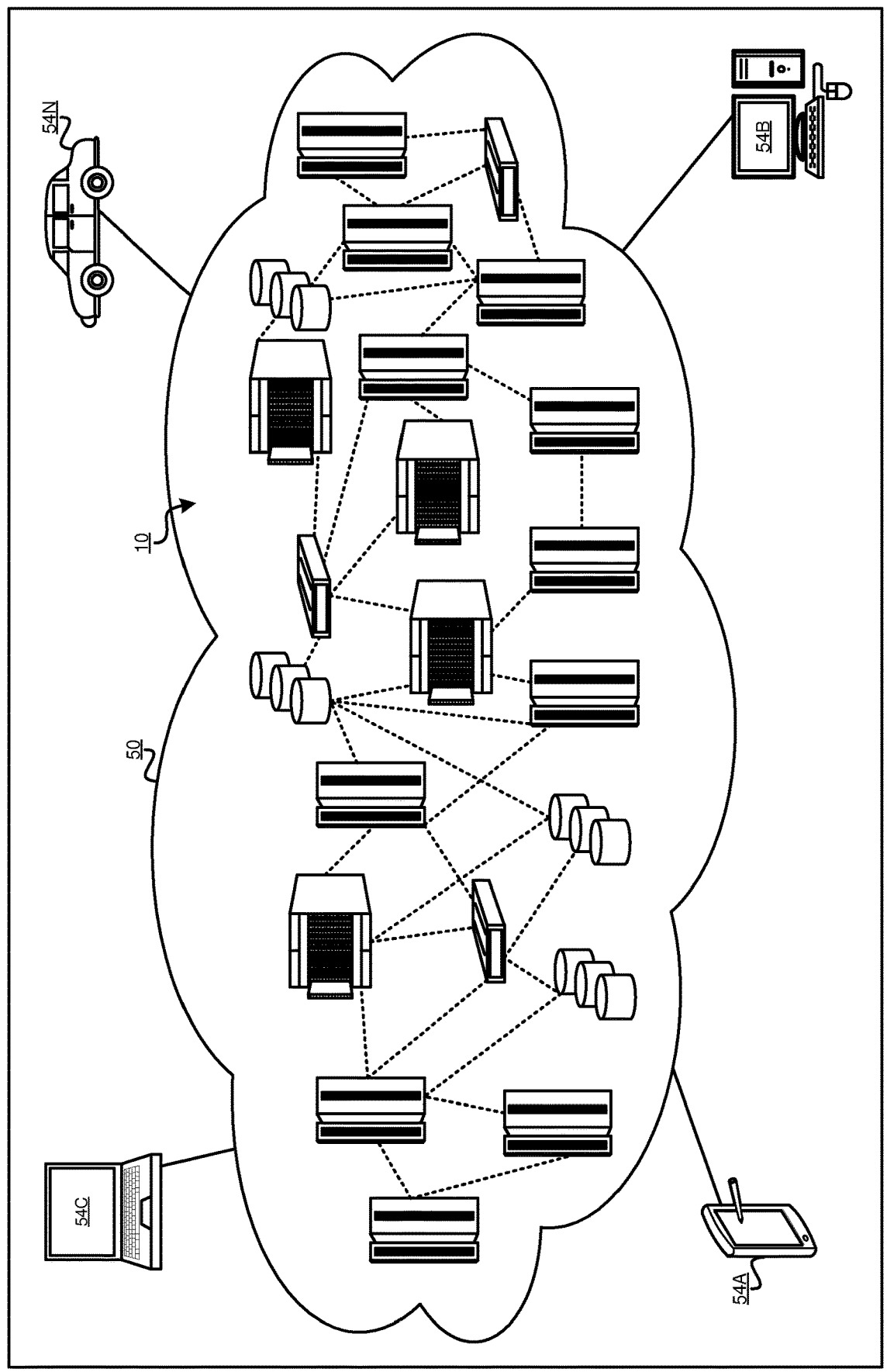
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 10:
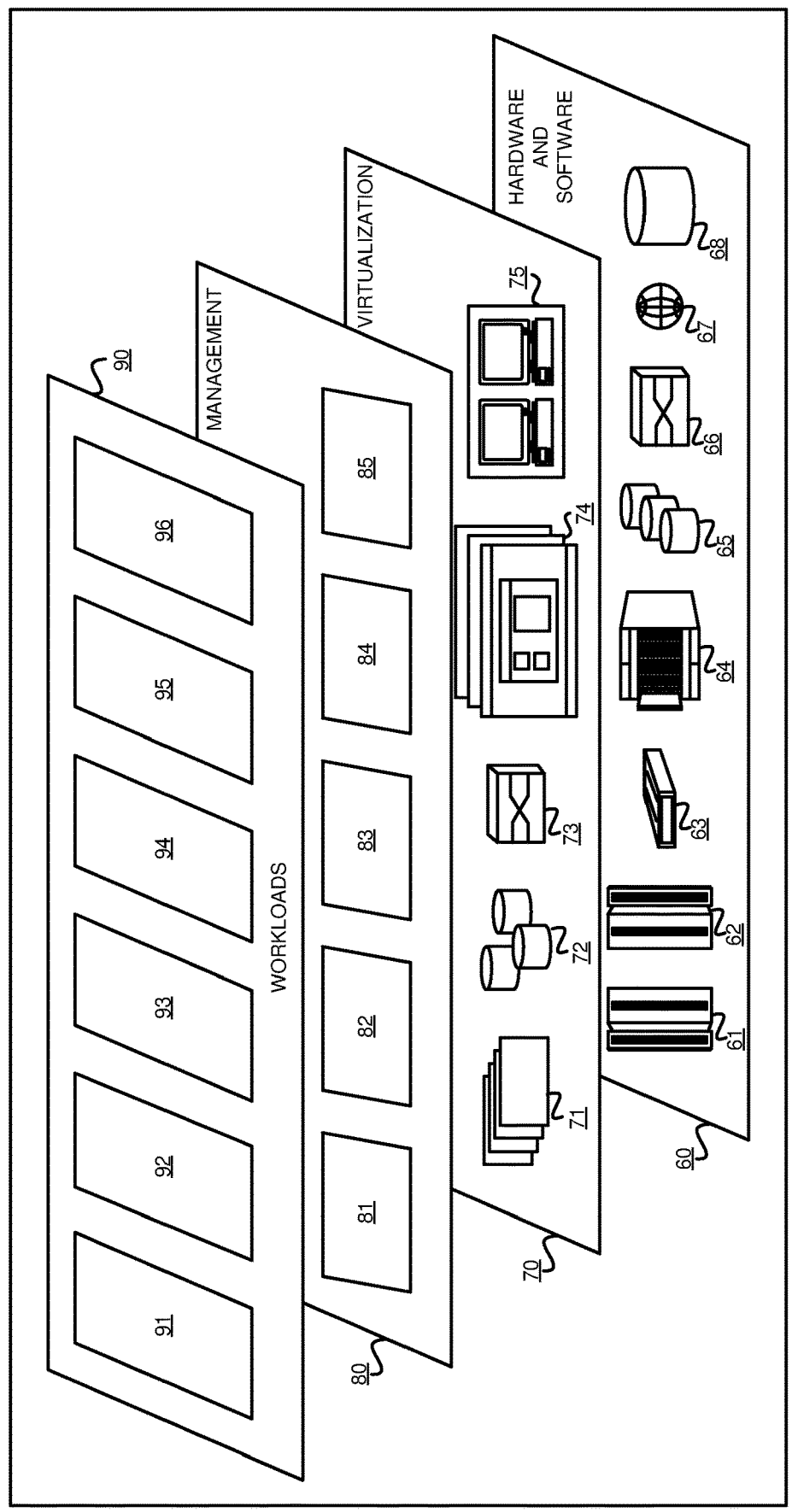
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automated multimodal adaptation of multimedia content and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    transforming, using a first trained generative adversarial network, a non-text portion of a first multimedia content into a text description of the first multimedia content;
    adjusting, using a trained attention layer, the text description, the adjusting creating an adjusted text description, the adjusting performed according to a presentation mode constraint, the presentation mode constraint specifying a presentation mode of a second multimedia content; and
    transforming, using a trained model, the adjusted text description into a non-text portion of the second multimedia content, the second multimedia content presented in the presentation mode specified by the presentation mode constraint;
    adjusting, according to feedback data, the presentation mode constraint;
    transforming, using the first trained generative adversarial network, a second portion of the first multimedia content into a second text description of the second portion;
    adjusting, using the trained attention layer, the second text description, the adjusting creating an adjusted second text description, the adjusting performed according to the adjusted presentation mode constraint; and
    transforming, using the trained model, the adjusted second text description into a second portion of the second multimedia content, the second portion of the second multimedia content presented in the presentation mode specified by the presentation mode constraint.

2. The computer-implemented method of claim 1, further comprising:
    training, using a discriminator network and knowledge domain specific training data, a first generative adversarial network, the training generating the first trained generative adversarial network.

3. The computer-implemented method of claim 1, further comprising:
    adjusting, using the trained attention layer, narrative text of the first multimedia content, the adjusting creating adjusted narrative text; and
    transforming, using the trained model, the adjusted narrative text into a paraphrased version of the narrative text of the first multimedia content, the trained model comprising a trained text paraphrasing model.

4. The computer-implemented method of claim 1, further comprising:
    adjusting, using the trained attention layer, narrative text of the second portion of the first multimedia content, the adjusting creating second adjusted narrative text; and
    transforming, using the trained model, the second adjusted narrative text into a paraphrased version of the narrative text of the second portion, the trained model comprising a trained text paraphrasing model.

5. The computer-implemented method of claim 1, wherein the adjusting is performed according to a time constraint, the time constraint constraining a duration of the second multimedia content relative to a duration of the first multimedia content.

6. The computer-implemented method of claim 1, wherein the adjusting is performed according to a content constraint, the content constraint constraining a target knowledge domain of the second multimedia content.

7. The computer-implemented method of claim 1, wherein the first multimedia content transformed by the first trained generative adversarial network comprises video content.

8. The computer-implemented method of claim 1, wherein the trained model comprises a second trained generative adversarial network trained to transform the adjusted text description into video content.

9. A computer program product for automated multimodal adaptation of multimedia content, the computer program product comprising:
    one or more computer readable storage media, and program instructions collectively stored on the one or more computer readable storage media, the program instructions comprising:

program instructions to transform, using a first trained generative adversarial network, a non-text portion of a first multimedia content into a text description of the first multimedia content;

program instructions to adjust, using a trained attention layer, the text description, the adjusting creating an adjusted text description, the adjusting performed according to a presentation mode constraint, the presentation mode constraint specifying a presentation mode of a second multimedia content; and program instructions to transform, using a trained model, the adjusted text description into a non-text portion of the second multimedia content, the second multimedia content presented in the presentation mode specified by the presentation mode constraint;

program instructions to adjust, according to feedback data, the presentation mode constraint;

program instructions to transform, using the first trained generative adversarial network, a second portion of the first multimedia content into a second text description of the second portion;

program instructions to adjust, using the trained attention layer, the second text description, the adjusting creating an adjusted second text description, the adjusting performed according to the adjusted presentation mode constraint; and program instructions to transform, using the trained model, the adjusted second text description into a second portion of the second multimedia content, the second portion of the second multimedia content presented in the presentation mode specified by the presentation mode constraint.

10. The computer program product of claim 9, further comprising:

program instructions to train, using a discriminator network and knowledge domain specific training data, a first generative adversarial network, the training generating the first trained generative adversarial network.

11. The computer program product of claim 9, further comprising:

program instructions to adjust, using the trained attention layer, narrative text of the first multimedia content, the adjusting creating adjusted narrative text; and program instructions to transform, using the trained model, the adjusted narrative text into a paraphrased version of the narrative text of the first multimedia content, the trained model comprising a trained text paraphrasing model.

12. The computer program product of claim 10, further comprising:

program instructions to adjust, using the trained attention layer, narrative text of the second portion of the first multimedia content, the adjusting creating second adjusted narrative text; and program instructions to transform, using the trained model, the second adjusted narrative text into a paraphrased version of the narrative text of the second portion, the trained model comprising a trained text paraphrasing model.

13. The computer program product of claim 9, wherein the adjusting is performed according to a time constraint, the time constraint constraining a duration of the second multimedia content relative to a duration of the first multimedia content.

14. The computer program product of claim 9, wherein the adjusting is performed according to a content constraint, the content constraint constraining a target knowledge domain of the second multimedia content.

15. The computer program product of claim 9, wherein the stored program instructions are stored in the at least one of the one or more storage media of a local data processing system, and wherein the stored program instructions are transferred over a network from a remote data processing system.

16. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 9, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to transform, using a first trained generative adversarial network, a non-text portion of a first multimedia content into a text description of the first multimedia content;

program instructions to adjust, using a trained attention layer, the text description, the adjusting creating an adjusted text description, the adjusting performed according to a presentation mode constraint, the presentation mode constraint specifying a presentation mode of a second multimedia content; and program instructions to transform, using a trained model, the adjusted text description into a non-text portion of the second multimedia content, the second multimedia content presented in the presentation mode specified by the presentation mode constraint;

program instructions to adjust, according to feedback data, the presentation mode constraint;

program instructions to transform, using the first trained generative adversarial network, a second portion of the first multimedia content into a second text description of the second portion;

program instructions to adjust, using the trained attention layer, the second text description, the adjusting creating an adjusted second text description, the adjusting performed according to the adjusted presentation mode constraint; and program instructions to transform, using the trained model, the adjusted second text description into a second portion of the second multimedia content, the second portion of the second multimedia content presented in the presentation mode specified by the presentation mode constraint.

* * * * *